June 21, 1949.  J. GROZA  2,473,644
SINKER
Filed Nov. 18, 1946
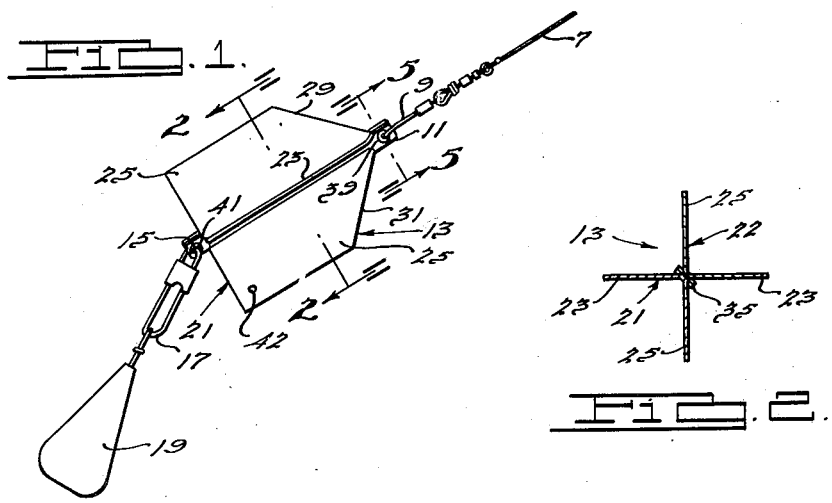
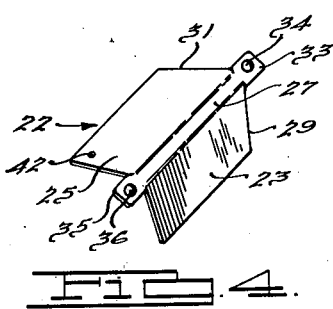
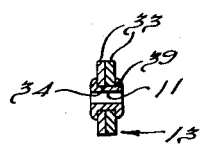
INVENTOR.
John Groza.
BY
ATTORNEYS.

Patented June 21, 1949

2,473,644

UNITED STATES PATENT OFFICE 2,473,644

SINKER

John Groza, Detroit, Mich.

Application November 18, 1946, Serial No. 710,682

2 Claims. (Cl. 43—27)

This invention relates to fishing lures and it has particular relation to a device for preventing the snagging of sinkers used on the ends of fish lines.

More particularly, this invention relates to and constitutes an improvement of such a device shown in the applicant's co-pending application, Serial No. 622,249, filed October 15, 1945 and now abandoned.

One object of the present invention is to provide a device for preventing snagging of the sinker when the fish line is pulled in.

A still further object of the invention is to provide a method of manufacturing a device of the aforementioned character which is efficient and inexpensive.

Other objects of the invention will become apparent from the following specification, from the drawings relating thereto and from the claims hereinafter set forth.

For a better understanding of the invention reference may be had to the drawings wherein:

Figure 1 is a side elevational view illustrating a device constructed according to one form of the invention, as seen when attached to the sinker and fish line;

Figure 2 is a cross sectional view taken substantially along the line 2—2 of Figure 1;

Figures 3 and 4 are perspective detailed views showing the two parts of the device prior to assembly thereof;

Figure 5 is a cross sectional view taken along the line 5—5 of Figure 1.

Referring to Fig. 1, the fish line is indicated at 7, and is shown connected by means of a loop 9 to an eye 11 at the upper end of a no-snagging device 13. The opposite end of the device 13 has a second eye 15 which is connected by a loop type pin 17 to a sinker 19. The device 13 comprises four wings arranged in 90° relation, and these wings are formed by means of plate elements 21 and 22, shown in separate relation in Figs. 3 and 4.

Each of the plate elements 21 and 22 is identical in construction to the other and like numerals on each element refer to similar parts. Each plate element is made preferably of sheet metal and is formed in a generally V-shape in end elevation by bending the plate to provide a pair of wings 23 and 25 which are disposed substantially at right angles to each other. The wings 23 and 25 terminate at their inner edges at opposite sides of a flat portion 27 extending along the apex of the plate element. The upper edges of each of the wings 23 and 25 are tapered as illustrated at 29 and 31 respectively and at the junction of the latter a tab 33 is formed which has an aperture 34 formed in the center thereof. At the lower end of the plate a second tab 35 is provided which projects downwardly from the flat portion 27, and is provided with an aperture 36.

The two plate elements 21 and 22 are assembled together to form the device 13 by placing each of the elements in a back to back relation to each other, with the backs of the flat portions 27 in an abutting relation, so that the four wings will be disposed substantially at right angles to each other. The elements 21 and 22 are then secured together by spot welding along the longitudinal abutting surfaces 27 or by riveting the two plates together by means of tubular rivets inserted through the apertures formed in the oppositely disposed tabs 33 and 35. This latter method is illustrated in the drawing, and is most clearly seen in Fig. 5 wherein a tubular rivet 39 is inserted through the adjacent apertures 34 in the adjacent tabs 33 of the plate elements. The rivet is headed to rigidly secure the two plate elements together, while leaving the central portion of the rivet hollow to provide the eye 11, previously described, which is connected to the fish line 7. A similar rivet 41 is inserted through the apertures 36 formed in the adjacent lower tabs 35 and forms the eye 15 which is connected to the sinker 19. If desired, the plate elements may be secured together by both riveting and spot welding. It will be noted that the wing 25 of each element is provided with an aperture 42 adjacent the lower, outer corner thereof to which fish hook leaders may be connected.

Assuming that the fish line has been thrown out and the sinker is on the bottom, any pull of the line upwardly will cause the device to move obliquely upwardly and during this movement the wings or at least two of them will act as guiders or elevators tending to cause the device to move upwardly through the water. In other words, instead of the sinker tending to move along the bottom as it would normally, the wings of the device 13 resist this movement and cause an oblique upward movement instead of a movement parallel to the bottom. At the same time, the tapered edges on the device facilitate its movement through weeds or past obstacles which otherwise would cause snagging of the sinker. Hence the device causes the sinker to rise, and at the same time it will move easily past or through weeds or other obstructions without being snagged.

Although only one form of the invention has been illustrated and described in detail, it will

What is claimed is:

1. A device for use on fish lines to prevent snagging comprising a pair of plate elements each bent to form angularly disposed wings thereon, tabs formed on each of said elements at the ends of their apex portions with each tab having an aperture formed therein, said elements being positioned with their apices in back to back abutting relation, the upper edges of the elements being tapered in converging relation towards said line of abutment, and means securing said elements in said position.

2. A device for use on fish lines to prevent snagging comprising a pair of plate elements each bent to form angularly disposed wings thereon, tabs formed on opposite ends of the apex portions of said elements and having apertures, said elements being positioned with the apex portions in back to back relation, the edges of the elements at one end being tapered in outwardly converging relation and tubular rivets positioned within said tab apertures and securing said elements together and providing means for connecting said device to a fish line at one end thereof and to a sinker at the other end thereof.

JOHN GROZA.

REFERENCES CITED

The following references are of record in the file of this patent:

UNITED STATES PATENTS

| Number | Name | Date |
| --- | --- | --- |
| 861,116 | Heddon | July 23, 1907 |
| 1,389,644 | Gottschalk | Sept. 6, 1921 |
| 1,476,139 | Bingham | Dec. 4, 1923 |
| 1,738,617 | Scharrer | Dec. 10, 1929 |
| 1,986,282 | Parker | Jan. 1, 1935 |
| 2,077,220 | Conway | Apr. 13, 1937 |
| 2,241,367 | Sarff | May 6, 1941 |